Aug. 2, 1960     J. B. LAZARUS     2,947,077
METHOD OF MANUFACTURING LAMINATED SHEET METAL FOR SHIM STOCK
Filed July 28, 1955
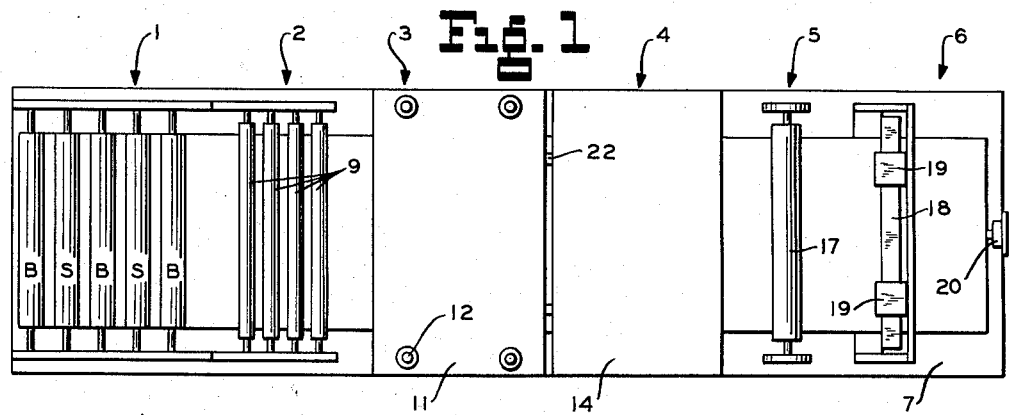
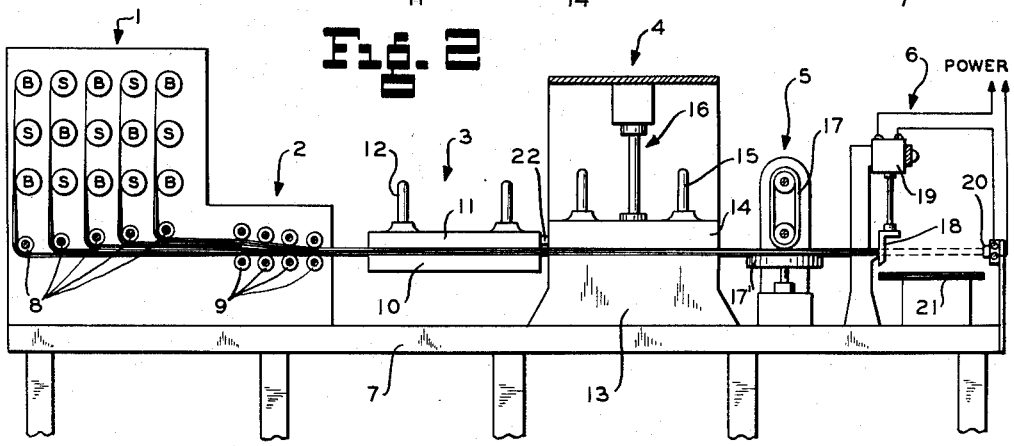
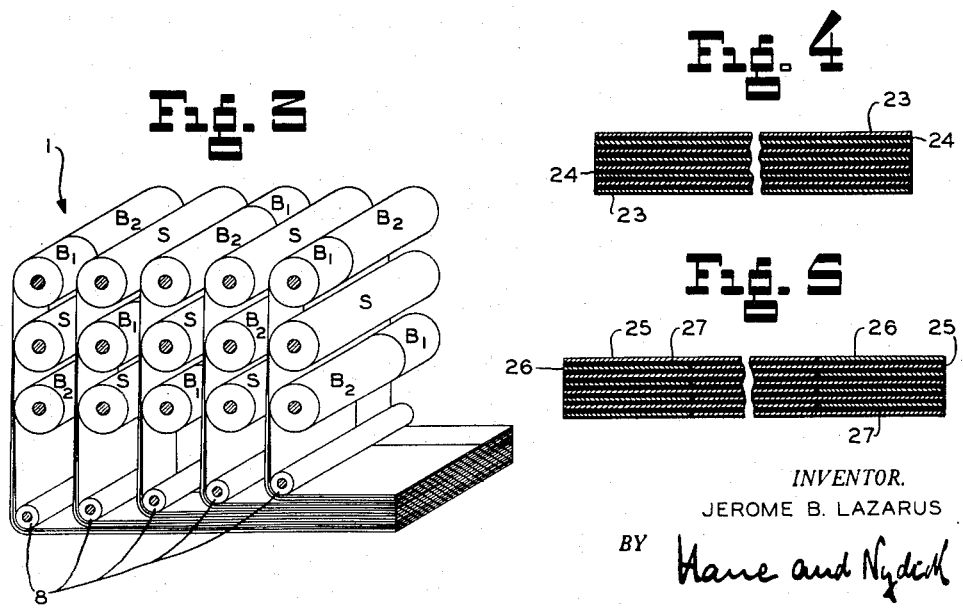
INVENTOR.
JEROME B. LAZARUS
BY *Hane and Nydick*
ATTORNEYS

United States Patent Office 2,947,077
Patented Aug. 2, 1960

2,947,077

METHOD OF MANUFACTURING LAMINATED SHEET METAL FOR SHIM STOCK

Jerome B. Lazarus, New York, N.Y., assignor, by mesne assignments, to The Staver Company Inc., Bay Shore, N.Y.

Filed July 28, 1955, Ser. No. 525,031

2 Claims. (Cl. 29—430)

The present invention relates to a method of manufacturing laminated sheets, and more particularly laminated metal shim stock; and it relates further to an installation for manufacturing laminated shim stock.

One of the objects of the present invention is to provide a novel and improved method of manufacturing shim stock in continuous lengths. Methods as heretofore known for the purpose permit the manufacture of a severely limited length of shim stock only. The manufacture of shim stock in continuous length obviously simplifies the manufacturing operations and reduces the costs of manufacture.

Another object of the invention is to provide a novel and improved method of manufacturing shim stock of practically any desired width whereas with methods as heretofore known, the width of the stock is limited to the width of metal sheets such as brass sheets that are available in the market.

Still another object of the invention is to provide a novel and improved method of manufacturing shim stock which readily permits to control the thickness of the shim stock and to maintain closer tolerances than practical with heretofore known methods.

A further object of the invention is to provide a novel and improved method of manufacturing shim stock which due to the uniformity of the bonding agent used, can be easily and cleanly peeled.

A still further object of the invention is to provide a novel and improved installation for manufacturing shim stock in accordance with the method according to the invention.

Other and further objects, features and advantages of the invention will be pointed out hereinafter and set forth in the appended claims forming part of the application.

In the accompanying drawing, several embodiments of an installation according to the invention suitable for carrying out the method of the invention are shown by way of illustration and not by way of limitation.

In the drawing:

Fig. 1 is a diagrammatic plan view of the installation.

Fig. 2 is an elevational side view of the installation according to Fig. 1.

Fig. 3 is a fragmentary isometric view of a modified part of the installation according to Figs. 1 and 2.

Fig. 4 is a sectional view of shim stock in an intermediate stage produced in the installation according to Figs. 1 and 2, and Fig. 5 is a sectional view of shim stock in the same intermediate stage produced in the installation according to Fig. 3.

The shim stock according to the invention is made from continuous strips of shim stock metal and metal solder. The invention is particularly suitable for manufacturing brass shims, but other shim material may also be used such as steel strips, especially steel strips flash coated with copper or brass. The metal of the solder strips may be any of the many conventional compositions known and suitable for the purpose such as tin-lead composition.

The method of the invention involves alternately feeding continuous strips of shim stock and solder to form a continuing stack of superimposed strips, compressing successive lengths of the stack to approximately the desired final thickness, heating successive lengths of the compressed stack sufficiently to melt the interleaved solder strips for fusing together the stock strips, submitting successive fused lengths to a pressure compressing the stack to its desired final thickness removing from successive compressed lengths of the stack squeezed-out excess solder and foreign matter adhering to said lengths thereby finishing the shim, and cutting the finished stock to units of desired length.

Referring now to Figs. 1, 2 and 4 in detail, the installation according to these figures comprises a supply station 1, a preliminary pressing station 2, a fusing station 3, a final pressing station 4, a finishing station 5 and a cutting station 6.

All the stations are mounted on a suitable base, appropriately spaced. The base is shown by way of example as a table 7.

Supply station 1 comprises a plurality of suitably mounted feed reels, depending upon the number of layers the shim stock is designed to have. The strips on all the reels are of equal width. Reels carrying brass strips are designated by B and reels carrying solder strips by S. Brass reels and solder reels are arranged in alternating sequence. The supply station further comprises guide means such as rolls 8 for feeding the strips to the preliminary pressing station 2 in superimposed alternating relationship.

The pressing station comprises pressure means which gradually reduces the thickness of the continuing stack formed by the strips from its initial thickness to a thickness slightly more than the desired final thickness of the strip. These pressing means are shown as comprising several pairs of rollers 9, the spacing of which is generally reduced toward the outlet end of the station.

From station 2 the continuing compressed stack is fed to station 3. The heating means in this station may be of any suitable design. There are shown a lower stationary heating platen 10 and an upper movable heating platen 11 which latter platen is perpendicularly guided by rods 12. Platens 10 and 11 are heated by suitable heating elements such as electric heating coils embedded in the material of the plates. The temperature to which the platens are heated is selected in accordance with the fusing temperature of the employed solder material.

Due to the heating experience by the stack between platens 10 and 11 the brass strips of the stack are fused together.

From station 3 the fused stack is passed to station 4. The pressing means of this station are shown as a lower stationary base 13 and an upper perpendicularly movable pressure plate 14. Plate 14 is guided by rods 15. The required pressure may be produced by any suitable means such as electromechanically or hydraulically operated devices well known for the purpose and indicated at 16. The pressure produced in station 4 is selected so that the stack is compressed to the desired final thickness.

From station 4 the fused and finally compressed stack is fed to the finishing station 5. This station serves to remove the excess solder squeezed out in station 4 and to polish the stack on both sides. There are shown as suitable for the purpose a lower rotating polishing disc 17' and an upper polishing belt 17. As is evident, various kinds of polishing means may be employed to clean both sides of the stack and also the edges thereof. When leaving station 5 the shim stock is finished.

The finished stock is fed from station 5 to the final station 6 in which it is cut to units of desired length. There is shown a cutter 18 which is reciprocated by a suitable and conventional electromagnetic device 19. Device 19 is controlled by a device 20 which includes a switch. This switch is closed by engagement with the end of the shim stock progressing toward device 20. Closing of the switch energizes device 19 which in turn actuates cutter 18. A cut-off length of shim is shown at 21.

The installation as hereinbefore described operates stepwise. As is apparent, the function of station 4 as shown requires that the superimposed strips are at rest when compressed in the station. It is also advantageous that the stack of strips is at rest when in station 3. Accordingly, the travel of the superimposed strips through the installation is intermittently arrested so that successive lengths of the stack are sequentially treated in the respective stations. To facilitate the operation of stations 3 and 4, the upper parts 11 and 14 respectively thereof are mechanically coupled as is indicated at 22.

However, as is apparent and within the scope of the invention the installation can also be designed for continuous travel of the superimposed strips by employing as pressure means in station 4 coacting pairs of rolls of the kind shown in station 2.

Fig. 4 shows the condition of the stack after leaving station 2 and before entering station 3. There are shown brass strips 23 and solder strips 24 in alternating superimposed relationship, all strips being of equal width.

As previously explained, the width of shim stock is controlled by the width of brass strip as available in the market. It is often desirable to produce shim stock in excess of the width of available brass strips. The modification according to Fig. 3 permits the manufacture of shim stock of any width desirable in practice. Tests have shown that shim stock having several times the width of the widest available brass strip can be readily produced with the arrangement of Fig. 3.

The installation of Fig. 3 permits to produce wide shim stock by placing several brass strips in juxtaposition in each respective layer of the shim stock. The width of the solder layers corresponds in each respective layer to the combined width of the brass strips. Solder material is available in any desired width.

While several brass strips of equal width may be employed in each respective layer, it has been found preferable to use brass strips of different width and to reverse the disposition of the strips from layer to layer. In Fig. 3 the narrow and wide brass strips are indicated by reference characters $B_1$ and $B_2$ respectively. This affords the advantage that the seam lines of adjacent brass layers are staggered thereby obtaining a more resistant product.

Fig. 5 shows wide strips 25 and narrow strips 26 in each brass layer interleaved with solder strips 27 having the full width of the juxtaposed brass strips. Fig. 5 also shows that the seam lines in each layer face solid brass material, in each adjacent layer after the superimposed strips are subjected to the fusing operation in station 3.

The sequential arrangement of the brass and solder reels in the station of Fig. 3 is the same as has been described in connection with Figs. 1 and 2.

While the invention has been described in detail with respect to certain now preferred examples and embodiments of the invention, it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A method of manufacturing a continuous length of laminated metal shim stock, comprising the steps of providing several equally thick strips of shim stock metal in juxtaposition and several continuous strips of heat fusible solder material, superimposing said shim strips and said solder strips composed of multiple alternating layers of several juxtaposed shim strips and one solder strip respectively, the width of the solder strip in each respective layer of the stack being substantially equal to the combined width of the juxtaposed shim strips in each layer, then heating successive lengths of the stack while at rest sufficiently to melt the interleaved solder strips for fusing together the superimposed shim strips, then submitting successive fused lengths of the stack by means of plane pressure plates to a uniform pressure upon the entire top and bottom surface area thereof, and compressing the respective fused lengths into the desired final thickness, removing from successive compressed and fused lengths of the stack squeezed out solder and foreign matter adhering to said length thereby finishing the shim stock, and cutting the finished stock to units of desired length.

2. The method according to claim 1 wherein the juxtaposed shim stock strips forming the respective layers of the stack are of different width and the seam lines of shim stock strips in adjacent respective layers are disposed in staggered relationship.

References Cited in the file of this patent

UNITED STATES PATENTS

| | | |
|---|---|---|
| 995,589 | Eichmann | June 20, 1911 |
| 1,096,512 | Lindhe | May 12, 1914 |
| 1,687,605 | Bundy | Oct. 16, 1928 |
| 1,764,271 | Leonard | June 17, 1930 |
| 1,940,850 | Derby | Dec. 26, 1933 |
| 2,175,616 | Reed | Oct. 10, 1939 |
| 2,181,502 | Biggert | Nov. 28, 1939 |
| 2,566,249 | Rainey et al. | Aug. 28, 1951 |
| 2,627,010 | Matteson | Jan. 27, 1953 |